(12) United States Patent
Lan et al.

(10) Patent No.: US 7,575,203 B2
(45) Date of Patent: Aug. 18, 2009

(54) MOUNTING APPARATUS FOR DATA STORAGE DEVICE

(75) Inventors: Hao Lan, Shenzhen (CN); Yu-Hai Liu, Shenzhen (CN); Pin-Shian Wu, Tu-Cheng (TW); Guang-Yao Lee, Tu-Cheng (TW); Chun-Chi Liang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,667

(22) Filed: Sep. 8, 2006

(65) Prior Publication Data

US 2007/0075194 A1    Apr. 5, 2007

(30) Foreign Application Priority Data

Sep. 30, 2005    (CN)    ......................... 2005 2 0065327

(51) Int. Cl.
*G12B 9/00*    (2006.01)
(52) U.S. Cl. ................. 248/27.1; 248/27.3; 248/220.21; 248/221.11; 248/222.11; 361/684; 361/685; 361/679.01; 361/679.02
(58) Field of Classification Search ............... 248/27.1, 248/27.3, 220.21, 221.11, 222.11; 361/684, 361/685
See application file for complete search history.

(56) References Cited

U.S. PATENT DOCUMENTS

| | | | |
|---|---|---|---|
| 5,510,955 A * | 4/1996 | Taesang | 361/685 |
| 6,297,954 B1 * | 10/2001 | Seo | 361/686 |
| 6,313,985 B1 * | 11/2001 | Chen et al. | 361/685 |
| 6,318,679 B1 * | 11/2001 | Yang et al. | 248/27.1 |
| 6,343,009 B1 * | 1/2002 | Liu et al. | 361/684 |
| 6,473,313 B1 * | 10/2002 | Chen et al. | 361/801 |
| 6,543,866 B2 * | 4/2003 | Chen et al. | 312/223.2 |
| 6,590,775 B2 * | 7/2003 | Chen | 361/725 |
| 6,654,240 B1 * | 11/2003 | Tseng et al. | 361/685 |
| 6,728,109 B1 * | 4/2004 | Wu | 361/747 |
| 6,798,653 B2 * | 9/2004 | Chen et al. | 361/685 |
| 7,038,907 B2 * | 5/2006 | Chen | 361/685 |
| 2005/0264991 A1 * | 12/2005 | Chou | 361/685 |
| 2007/0075200 A1 * | 4/2007 | Guo et al. | 248/282.1 |
| 2007/0145866 A1 * | 6/2007 | Huang et al. | 312/215 |

* cited by examiner

*Primary Examiner*—J. Allen Shriver, II
*Assistant Examiner*—Nkeisha J Smith
(74) *Attorney, Agent, or Firm*—Wei Te Chung

(57) ABSTRACT

A mounting apparatus for holding a storage device defining at least a mounting hole in a bottom thereof, the mounting apparatus comprises a bracket and a locking member. A support plate is arranged inward from a sidewall of the bracket. The storage device is disposed on the support plate. The locking member is movably connected to the bracket, and comprises at least one locking portion. The at least one locking portion is inserted in the at least one mounting hole to hold the storage device.

14 Claims, 6 Drawing Sheets

MOUNTING APPARATUS FOR DATA STORAGE DEVICE

FIELD OF THE INVENTION

The present invention relates to mounting apparatuses for data storage devices, and particularly to a mounting apparatus for readily attaching or detaching a data storage device to or from a bracket.

DESCRIPTION OF RELATED ART

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

Typically, data storage devices are attached to a bracket with bolts, and then the bracket is attached to a computer enclosure. However, fixing a data storage device with bolts is unduly laborious and time-consuming. The bolts after being unscrewed are very inconvenient to be stored, and are prone to be lost. Especially, because the interior space of the computer enclosure is very limited, some elements at two opposite sides of the data storage device must be detached in order to achieve operating space for carrying out the fixing operation.

What is needed is a mounting apparatus for readily attaching or detaching a data storage device to or from a bracket.

SUMMARY OF THE INVENTION

An exemplary mounting apparatus for holding a storage device defining at least a mounting hole in a bottom thereof, the mounting apparatus comprises a bracket and a locking member. A support plate is arranged inward from a sidewall of the bracket. The storage device is disposed on the support plate. The locking member is movably connected to the bracket, and comprises at least one locking portion. The at least one locking portion is inserted in the at least one mounting hole to hold the storage device.

Other advantages and novel features will become more apparent from the following detailed description when taken in conjunction with the accompanying drawings, in which:

DETAILED DESCRIPTION OF THE INVENTION

Figure 1:
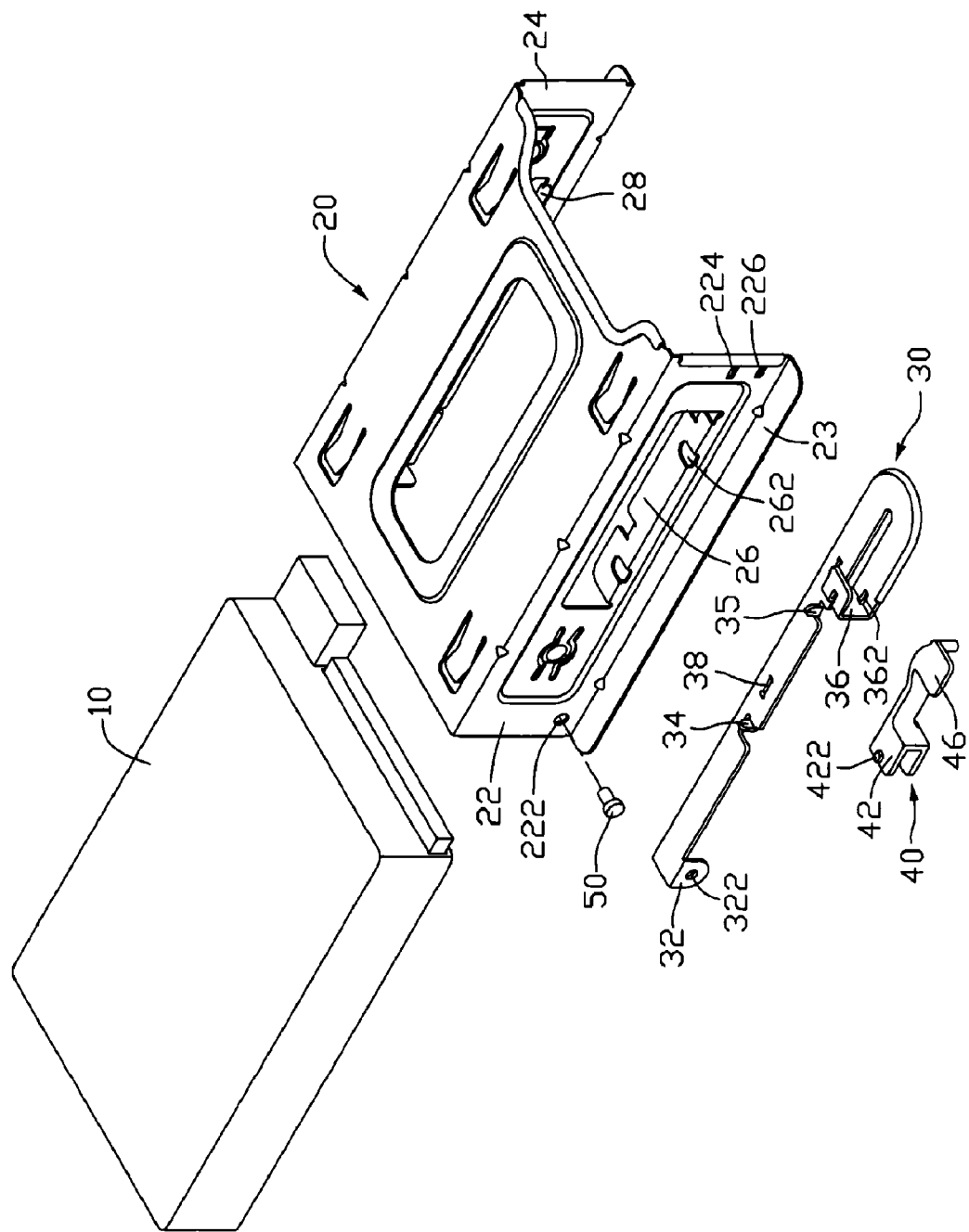
FIG. 1 is an exploded, isometric view of a mounting apparatus in accordance with the present invention, with a data storage device.
Figure 2:
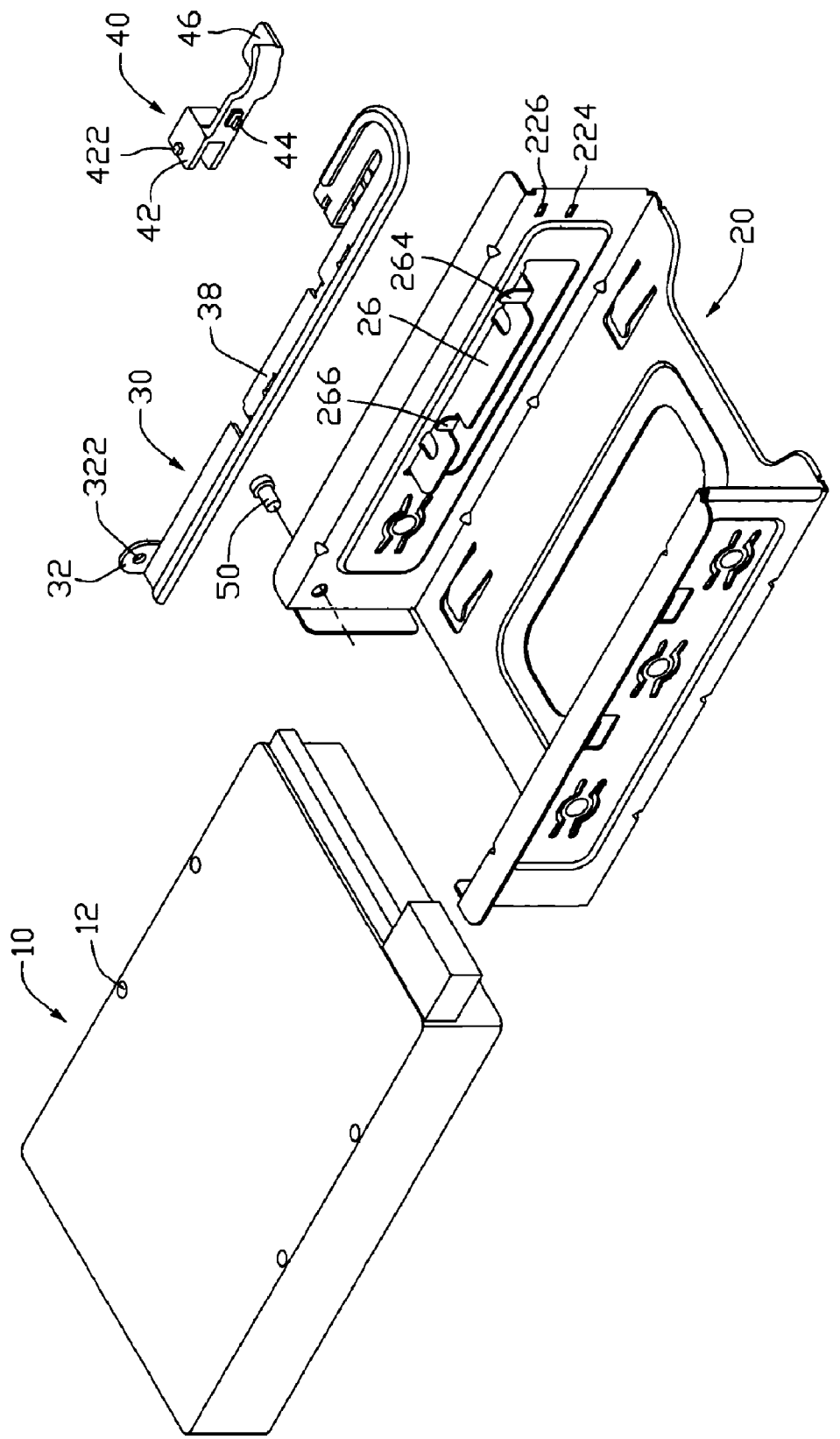
FIG. 2 is an inverted view of FIG. 1.

Referring to FIGS. 1 and 2, a mounting apparatus in accordance with a preferred embodiment of the present invention is provided to fasten a data storage device 10 therein. The data storage device 10 defines two mounting holes 12 in a bottom thereof. The mounting apparatus includes a bracket 20, a locking member 30 pivotably mounted to the bracket 20, and an operating member 40.

The bracket 20 is generally U-shaped, and includes a first sidewall 22, a second sidewall 24, and a top wall connecting the first and second sidewalls 22, 24. A flange 23 is bent out from a lower edge of each of the first and second sidewalls 22, 24, for being secured to a computer enclosure (not shown). A through aperture 222 is defined in a lower portion of a left side of the first sidewall 22. Two positioning holes 224, 226 are defined in a right side of the first sidewall 22, the positioning hole 224 is above the positioning hole 226. A support plate 26 is stamped inward from the first sidewall 22, and parallel with but offset from the flanges 23. The support plate 26 defines two through holes 262 therein corresponding to the mounting holes 12 of the data storage device 10. A first bent tab 264 and a second bent tab 266 are stamped down from the support plate 26, and the first bent tab 264 is longer than the second bent tab 266. Two support plates 28 are stamped inward from the second sidewall 24.

The locking member 30 is integrally formed in a generally J shape from a piece of metal sheet. One end portion of the locking member 30 is bent down to form a pivot portion 32. A pivot hole 322 is defined in the pivot portion 32. The locking member 30 forms a first locking portion 34, and a second locking portion 35 corresponding to the mounting holes 12 of the data storage device 10, respectively. The other end portion of the locking member 30 surrounds the right side of the first sidewall 22. A distal end of the other end portion of the locking member 30 forms a U-shaped receiving slot 36. Two opposite side plates of the locking slot 36 each define a receiving hole 362 therein. A reinforcing rolled rim is formed at an outer edge of the locking member 30. Two positioning slots 38 are defined in the locking member 30 corresponding to the first and second bent tabs 264, 266 of the bracket 20.

The operating member 40 includes a U-shaped mounting portion 42 and a handle 46. Two protrusions 422 extend out from two opposite side plates of the mounting portion 42, respectively. A stepped block 44 extends from a middle of the operating member 40.

Figure 3:
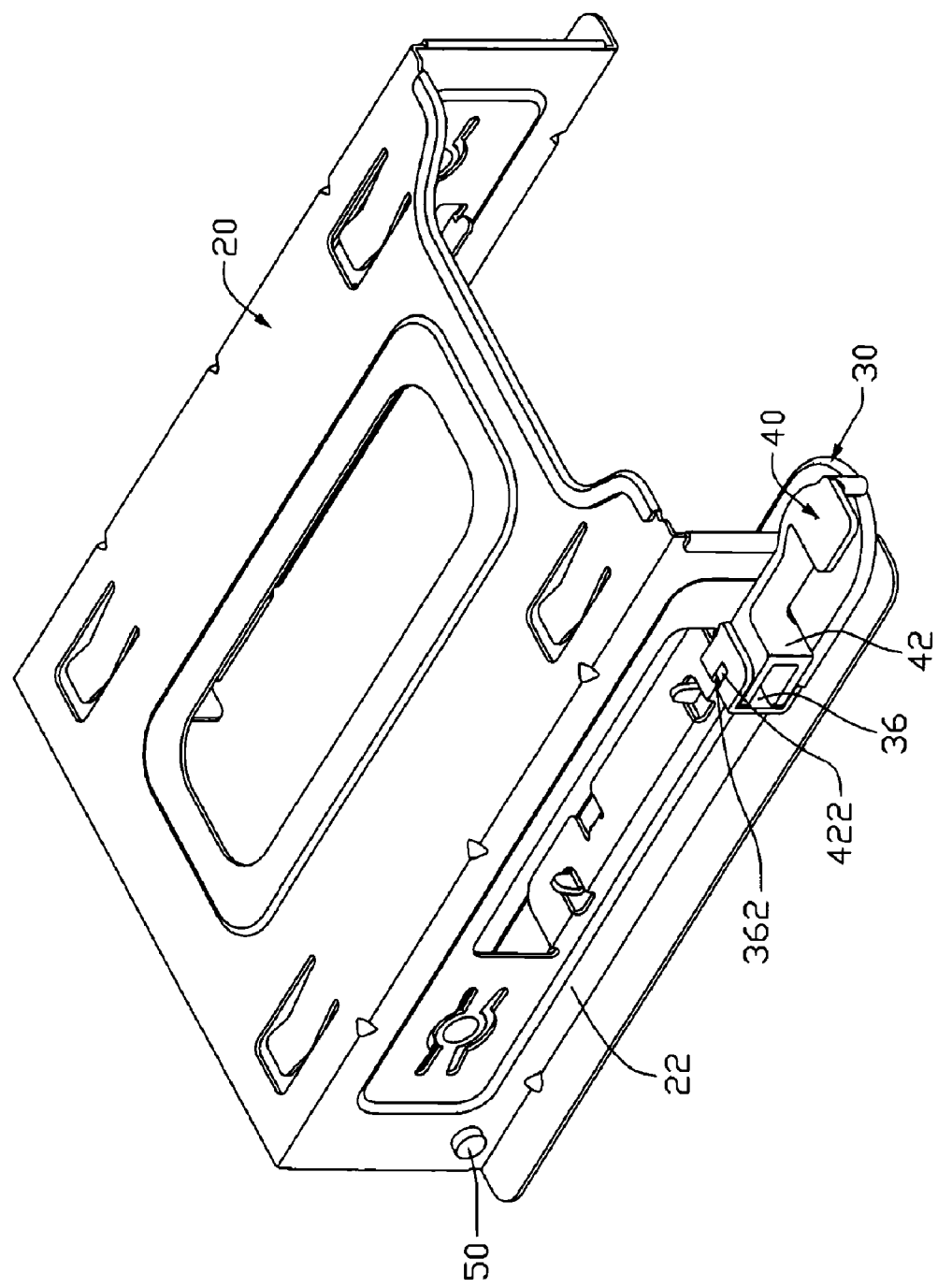
FIG. 3 is an assembled view of the mounting apparatus of FIG. 1.
Figure 4:
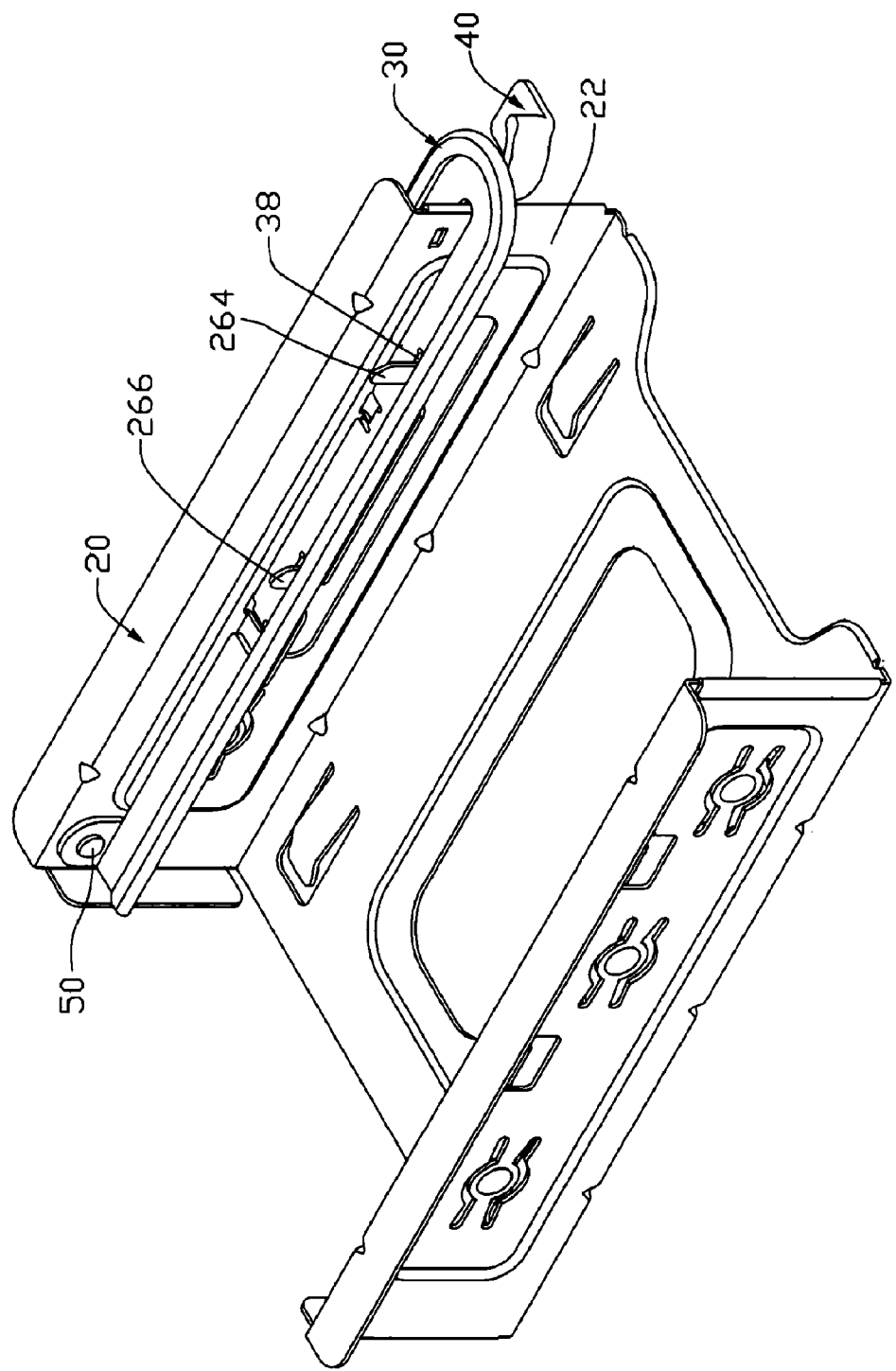
FIG. 4 is an inverted view of FIG. 3.

Referring also to FIGS. 3 and 4, in assembling the mounting apparatus, the mounting portion 42 of the operating member 40 is inserted into the receiving slot 36 of the locking member 30, with the protrusions 422 of the mounting portion 42 received in the receiving holes 362 of the receiving slot 36. The locking member 30 is pivotably mounted to an inner side of the first sidewall 22 of the bracket 20 with a rivet 50 extending through the through aperture 222 of the bracket 20 and the pivot hole 322 of the locking member 30 in turn. The first and second bent tabs 264, 266 of the support plate 26 are received in the positioning slots 38 of the locking member 30, respectively. Thus, the locking member 30 is mounted to the bracket 20 and the operating member 40 is in a first (unlocked) position with the block 44 in the positioning hole 226.

Figure 5:
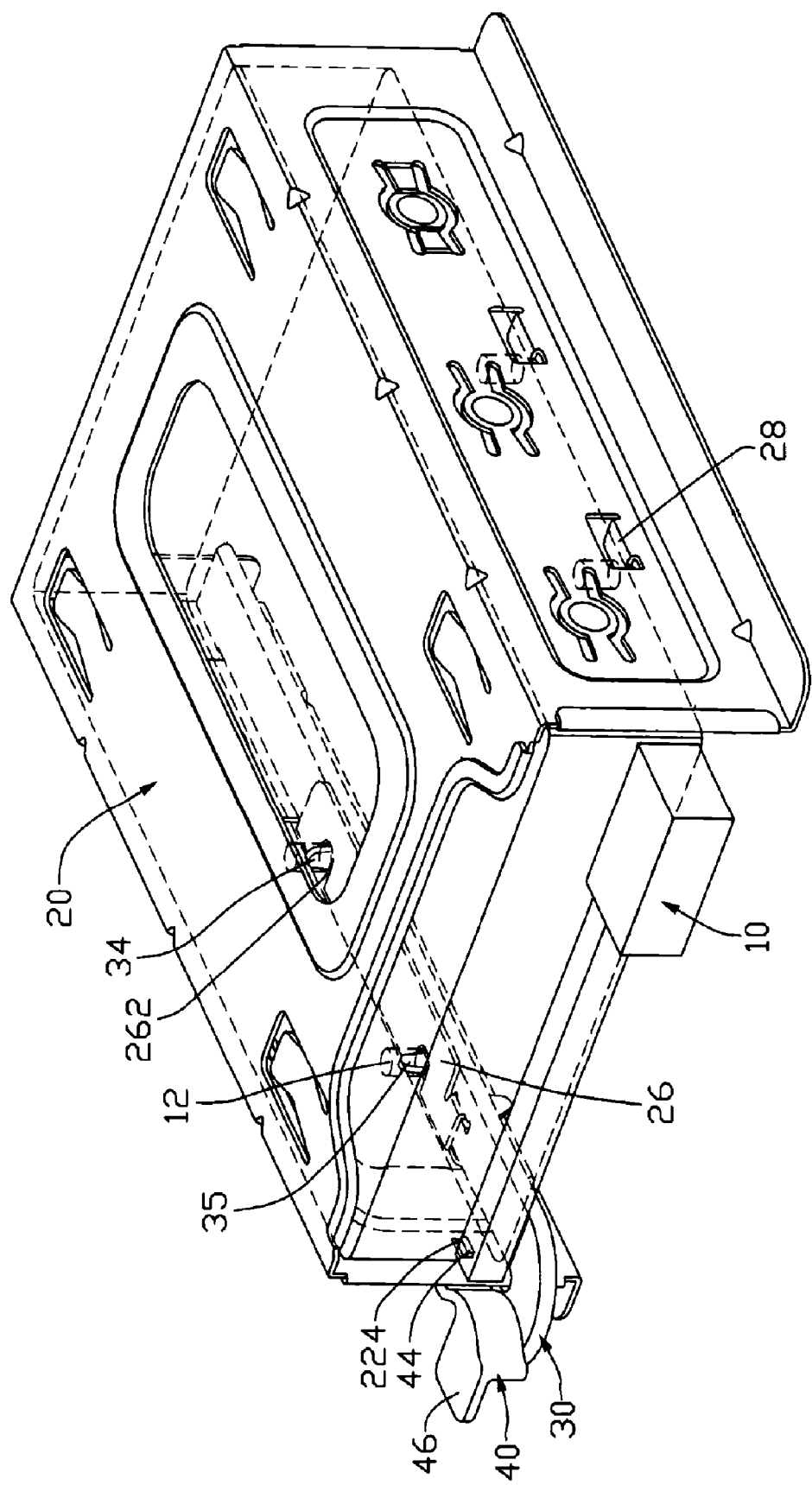
FIG. 5 is an assembled view of FIG. 1, the mounting apparatus in a locked state.

Referring also to FIG. 5, the data storage device 10 is pushed into the bracket 20 along the support plates 26 and 28. The handle 46 (being formed of a flexible material) is grasped and pulled, thus flexing the operating member 40, so that the block 44 retracts from the positioning hole 226, and then the locking member 30 is pivoted around the rivet 50, until the first and second locking portions 34, 35 extend through the through holes 262 of the bracket 20 and into the mounting holes 12 of the data storage device 10. At this time, the block 44 of the operating member 40 engages in the positioning hole 224 in a second (locked) position of the bracket 20 thereby positioning the locking member 30. Thus, the data storage device 1 0 is secured in the bracket 20.

Figure 6:
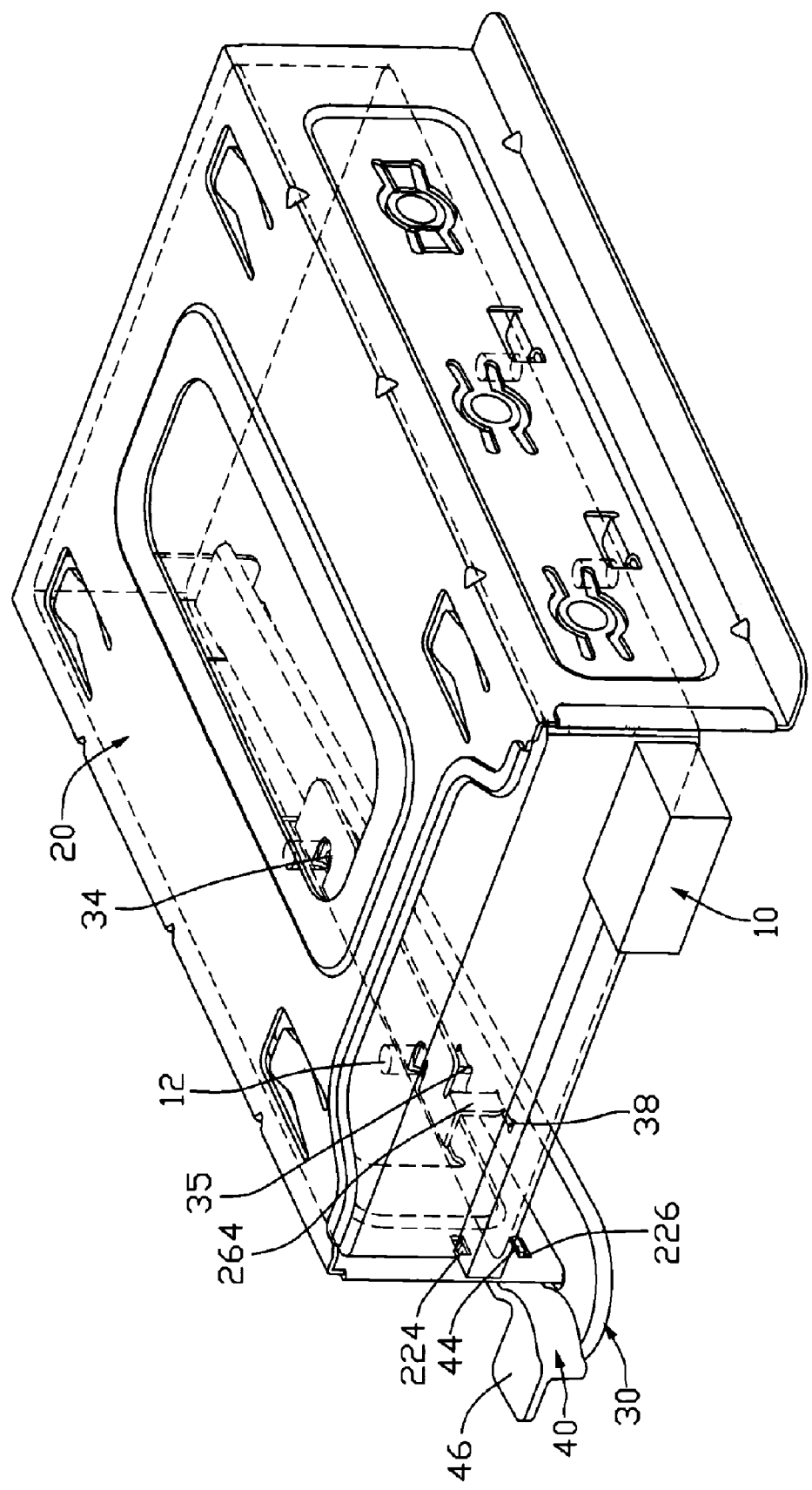
FIG. 6 is an assembled view of FIG. 1, the mounting apparatus in an unlocked state.

Referring also to FIG. 6, in disassembly, the handle 46 of the operating member 40 is moved to withdraw the block 44 from the positioning hole 224. The handle 46 is then moved down until the block 44 aligns with the positioning hole 226. The block 44 is urged into the positioning hole 226 via a restoring force of the operating member 40. During the course of moving down, the first and second locking portions 34, 35 successively withdraw from the corresponding mounting holes 12 of the data storage device 10. The data storage device 10 can then be taken out from the bracket 20.

During the movement of the locking member 30, the first bent tab 264 and the second bent tab 266 of the bracket 20 are always retained in the corresponding positioning slots 38 of the locking member 30 for guiding the locking member 30.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A mounting apparatus for holding a storage device, the storage device defining at least a mounting hole in a bottom thereof, the mounting apparatus comprising:
    a bracket, a support plate being arranged inward from a sidewall of the bracket, the support plate being configured for supporting the storage device; and
    a locking member movably connected to the bracket, the locking member comprising at least one locking portion, the at least one locking portion being configured for insertion in the at least one mounting hole in a manner so as to hold the storage device on the support plate;
    wherein the support plate comprises at least one bent tab extending down therefrom, the locking member defines at least one positioning slot therein for guidingly receiving the at least one bent tab;
    wherein the locking member comprises one end pivotably connected to the bracket, and another end engagable on the bracket, the sidewall of the bracket defines two positioning holes, one above another, one of the positioning holes is configured to position the locking member in a locked position, the other one of the positioning holes is configured to position the locking member in an unlocked positions;
    wherein the mounting apparatus further comprises an operating member attached to a distal end of said another end of the locking member, the operating member comprising a handle.

2. The mounting apparatus as claimed in claim 1, wherein the locking member is pivotably attached to an inner side of the sidewall of the bracket, said another end of the locking member surrounds an end portion of the sidewall of the bracket.

3. The mounting apparatus as claimed in claim 1, wherein the distal end of said another end of the locking member forms a U-shaped locking slot, two opposite side plates of the locking slot each define a receiving hole, the operating member comprises a U-shaped mounting portion received in the locking slot of the locking member, two protrusions extend out from two opposite side plates of the mounting portion to be received in the receiving holes of the locking slot.

4. The mounting apparatus as claimed in claim 1, wherein the operating member comprises a block extending therefrom, to engage with the bracket thereby positioning the locking member.

5. The mounting apparatus as claimed in claim 1, wherein the support plate defines at least one through hole therein, the at least one locking portion of the locking member extends through the at least one through hole to engage in the at least one mounting hole of the storage device.

6. A mounting apparatus for holding a storage device defining at least one mounting hole in a bottom thereof, the mounting apparatus comprising:
    a bracket for accommodating the storage device, the bracket comprising a sidewall and a support plate extending from the sidewall configured for the bottom of the storage device resting thereon; and
    a locking member being generally J-shaped, and having one end portion pivotably attached to the sidewall of the bracket and then located under the support plate, and an opposite end portion surrounding an end of the sidewall to form a distal portion substantially parallel with and along an outer surface of the sidewall to engage with an engaging portion of the outer surface of the sidewall thereby locating the locking member in a first position, the locking member comprising at least one locking portion, the at least one locking portion being configured so as to be locked in the at least one mounting hole of the storage device to secure the storage device in the bracket when the locking member is in the first position.

7. The mounting apparatus as claimed in claim 6, wherein the engaging portion comprises a positioning hole defined in the outer surface of the sidewall.

8. The mounting apparatus as claimed in claim 7, further comprising an operating member attached to the distal portion of the locking member.

9. A mounting apparatus assembly comprising:
    a storage device defining at least one mounting hole in a bottom thereof;
    a bracket comprising two opposite sidewalls configured for abutting two sides of the storage device, and a support plate arranged perpendicularly inward from one of the sidewalls configured for supporting the bottom of the storage device but exposing the at least one mounting hole of the bottom; and
    a locking member comprising two opposite end portions and at least one locking portion between the end portions, one of the end portions located under the support plate at an inner side of said one of the sidewalls, and pivotably attached to the bracket around an axis perpendicular to said one of the sidewalls, such that the other one of the end portions is movable toward or away from the storage device which results in the at least one locking portion upwardly extends through the support plate to engage into the at least one mounting hole of the storage device or downwardly retracts from the at least one mounting hole of the storage device.

10. The mounting apparatus assembly as claimed in claim 9, wherein said other one of the end portions is lockable to said one of the sidewalls when the at least one locking portion engages into the at least one mounting hole of the storage device.

11. The mounting apparatus assembly as claimed in claim 9, wherein said other one of the end portions of the locking member is generally J-shaped to surround an end of said one of the sidewalls, said other one of the end portions of the locking member comprises a block to engage in a positioning hole of said one of the sidewalls from an outer side of said one of the sidewalls.

12. The mounting apparatus assembly as claimed in claim 9, wherein said other one of the end portions is lockable to said one of the sidewalls when the at least one locking portion retracts from the at least one mounting hole of the storage device.

13. The mounting apparatus assembly as claimed in claim 9, wherein said one of the sidewalls defines a pair of upper and lower holes, an operation member is secured with said other one of the end portions of the locking member at an outside of said one of the sidewalls, the operating member forms thereat a block engaging in the upper hole when the at least one locking portion engages into the at least one mounting hole of the storage device, or engaging in the lower hole when the at least one locking portion retracts from the at least one mounting hole of the storage device.

14. The mounting apparatus as claimed in claim 7, wherein another positioning hole is defined in the outer surface of the sidewall right under the positioning hole, for engaging with said opposite end portion of the locking member thereby locating the locking member in a second position in which the at least one locking portion of the locking member retracts from the at least one mounting hole of the storage device.

* * * * *